United States Patent
Seo et al.

(10) Patent No.: US 9,774,599 B2
(45) Date of Patent: Sep. 26, 2017

(54) AUTHENTICATING METHOD AND APPARATUS USING ELECTRONIC DEVICE

(71) Applicant: Samsung Electronics Co., Ltd., Suwon-si (KR)

(72) Inventors: Young-Jun Seo, Yongin-si (KR); Geun-Yong Kim, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 85 days.

(21) Appl. No.: 14/844,743

(22) Filed: Sep. 3, 2015

(65) Prior Publication Data

US 2016/0099938 A1 Apr. 7, 2016

(30) Foreign Application Priority Data

Oct. 6, 2014 (KR) .................. 10-2014-0134333

(51) Int. Cl.
*H04L 9/32* (2006.01)
*H04L 29/06* (2006.01)

(52) U.S. Cl.
CPC ...... *H04L 63/0869* (2013.01); *H04L 63/0853* (2013.01); *H04L 63/0861* (2013.01); *H04L 63/18* (2013.01); *H04L 2463/102* (2013.01)

(58) Field of Classification Search
None
See application file for complete search history.

(56) References Cited

U.S. PATENT DOCUMENTS

| 2003/0204526 A1* | 10/2003 | Salehi-Had | G06F 21/35 |
| 2013/0097233 A1 | 4/2013 | Raman et al. | |
| 2014/0089673 A1 | 3/2014 | Luna | |
| 2014/0337634 A1* | 11/2014 | Starner | H04L 9/3231 713/186 |
| 2014/0366123 A1* | 12/2014 | DiBona | G06Q 10/00 726/16 |
| 2015/0071437 A1* | 3/2015 | Chastain | H04W 12/04 380/249 |

FOREIGN PATENT DOCUMENTS

| KR | 100610242 | 8/2006 |
| KR | 20140064694 | 5/2014 |

* cited by examiner

*Primary Examiner* — Fatoumata Traore
(74) *Attorney, Agent, or Firm* — McAndrews, Held & Malloy, Ltd.

(57) ABSTRACT

An authentication method and apparatus for an electronic device. A first electronic device transmits a mutual authentication request for the first electronic device and a second electronic device communication-connected with the first electronic device to an authentication server. The first electronic device receives mutual authentication information for each of the first electronic device and the second electronic device from the authentication server, and stores the mutual authentication information in the first electronic device and the second electronic device. The first electronic device determines whether reliability of an authentication state between the first electronic device and the second electronic device is maintained. The first electronic device acquires an authentication result for a service using the second electronic device from the authentication server by using the mutual authentication information for each of the first electronic device and the second electronic device, when the reliability is maintained.

16 Claims, 9 Drawing Sheets

AUTHENTICATING METHOD AND APPARATUS USING ELECTRONIC DEVICE

CROSS-REFERENCE TO RELATED APPLICATION(S)

This application claims the benefit under 35 U.S.C. §119(a) of a Korean patent application filed in the Korean Intellectual Property Office on Oct. 6, 2014 and assigned Serial No. 10-2014-0134333, the entire disclosure of which is incorporated herein by reference.

TECHNICAL FIELD

Various embodiments of the present disclosure relate to an authenticating method and apparatus using an electronic device.

BACKGROUND

For a service that needs authentication with respect to a user (e.g., payment, a membership service, permission of entry, and so forth), an authentication process may be performed. The authentication process may be a process of authenticating the user to allow only the authenticated user to use the service.

Recently, authentication using an electronic device such as a smartphone has also been used. For example, a user of the electronic device may continue the authentication process by logging in an account generated for a service to be used through authentication using the electronic device. To log in the account, user information (e.g., account information such as an Identification (ID) and a password) may be needed.

For authentication using an electronic device, the electronic device may need an Input/Output (I/O) interface for inputting user information and displaying authentication-related information to allow the user to check the information, a communication interface capable of communicating with an authentication system, and a processor capable of performing an authentication process.

As an electronic device, such as a wearable device, is miniaturized to improve portability, the electronic device may have limited performance (or specifications) such as a simpler input device, a smaller screen, and a lower computation capability than a high-performance (or high-specification) electronic device, such as a smartphone. A limited-performance electronic device, such as a wearable device, may not be satisfactory to perform the authentication process because it is restrictedly capable of or is not even capable of allowing input of the user information and displaying or communicating information associated with authentication. Moreover, the electronic device such as the wearable device is highly likely to be lost or stolen, and may be weak to external threats, such as hacking.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide an authentication method and apparatus capable of performing safe and reliable authentication through interworking between a limited-performance electronic device such as a wearable device and a high-performance electronic device such as a smartphone.

In accordance with an aspect of the present disclosure, there is provided an authentication method for a first electronic device, the authentication method including transmitting a mutual authentication request for the first electronic device and a second electronic device communication-connected with the first electronic device to an authentication server, receiving mutual authentication information for each of the first electronic device and the second electronic device from the authentication server, storing the received mutual authentication information in the first electronic device and the second electronic device, determining whether reliability of an authentication state between the first electronic device and the second electronic device is maintained, acquiring an authentication result for a service using the second electronic device from the authentication server by using the mutual authentication information for each of the first electronic device and the second electronic device, when the reliability is maintained, and providing the authentication result to the second electronic device.

In accordance with another aspect of the present disclosure, there is provided an authentication method for a second electronic device, the authentication method including transmitting a mutual authentication request for the second electronic device and a first electronic device communication-connected with the second electronic device to the first electronic device, receiving mutual authentication information regarding the second electronic device via mutual authentication information issued by an authentication server for each of the first electronic device and the second electronic device from the first electronic device, storing the received mutual authentication information, determining whether reliability of an authentication state between the first electronic device and the second electronic device is maintained, and acquiring an authentication result for a service using the second electronic device from the authentication server through the first electronic device by using the mutual authentication information regarding the second electronic device, when the reliability is maintained.

In accordance with another aspect of the present disclosure, there is provided a first electronic device including a communication interface configured to communication-connect to a second electronic device and an authentication server, a memory configured to store mutual authentication information regarding the first electronic device, and a processor configured to transmit a mutual authentication request for the first electronic device and the second electronic device to an authentication server, to receive mutual authentication information for each of the first electronic device and the second electronic device from the authentication server, to store the received mutual authentication information in the first electronic device and the second electronic device, to determine whether reliability of an authentication state between the first electronic device and the second electronic device is maintained, to acquire an authentication result for a service using the second electronic device from the authentication server by using the mutual authentication information for each of the first electronic device and the second electronic device, when the reliability is maintained, and to provide the authentication result to the second electronic device.

In accordance with another aspect of the present disclosure, there is provided a second electronic device including a communication interface configured to communication-connect with a first electronic device, a memory configured to store mutual authentication information regarding the second electronic device, and a processor configured to transmit a mutual authentication request for the first electronic device and the second electronic device to the first electronic device, to receive mutual authentication information regarding the second electronic device via mutual authentication information issued by an authentication server for each of the first electronic device and the second electronic device from the first electronic device, to store the received mutual authentication information, to determine whether reliability of an authentication state between the first electronic device and the second electronic device is maintained, and to acquire an authentication result for a service using the second electronic device from the authentication server through the first electronic device by using the mutual authentication information regarding the second electronic device, when the reliability is maintained.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
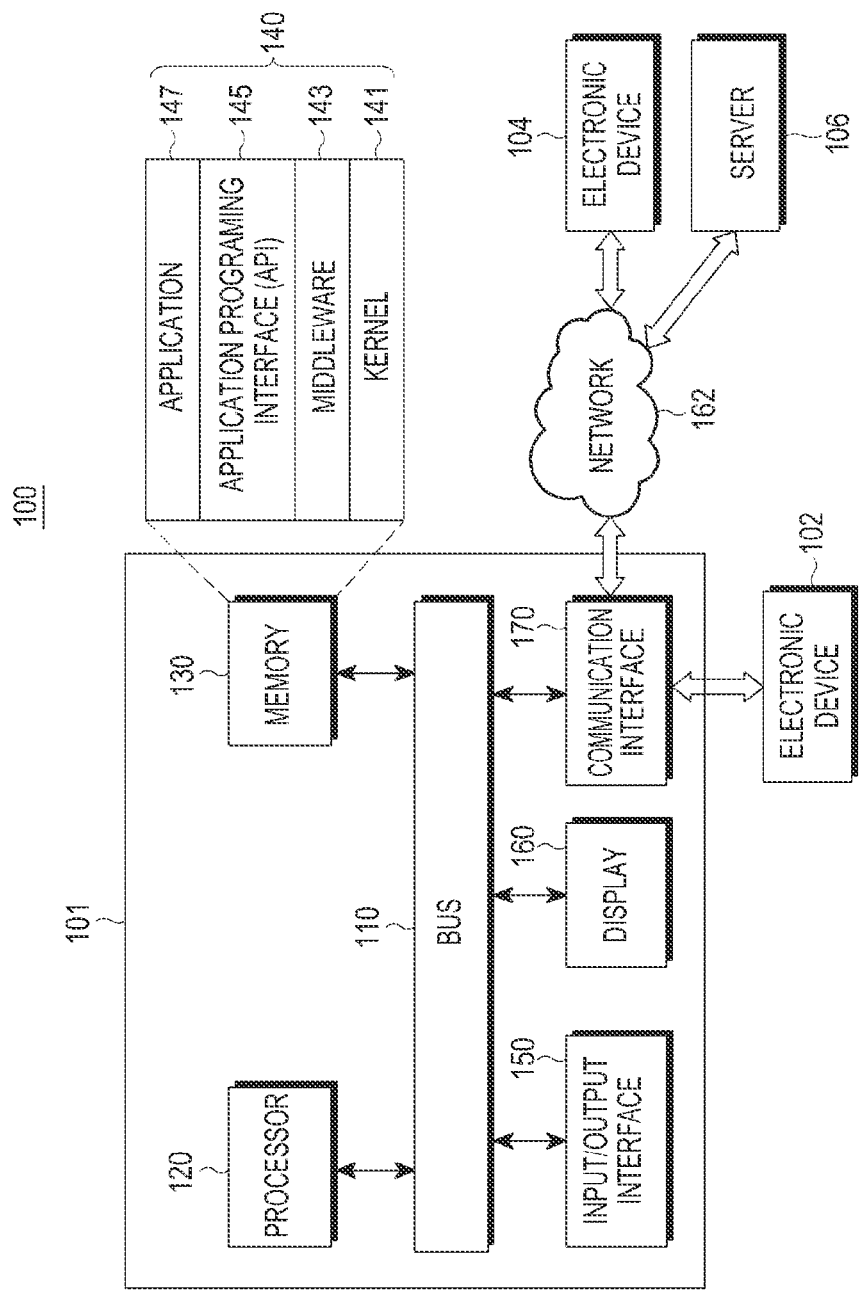
FIG. 1 is a block diagram of a network environment including an electronic device according to various embodiments of the present disclosure.

Exemplary embodiments of the present disclosure will be described herein below with reference to the accompanying drawings. Although specific embodiments of the present disclosure are illustrated in the drawings and relevant detailed descriptions are provided, various changes can be made to the exemplary embodiments and various exemplary embodiments may be provided. Accordingly, the various exemplary embodiments of the present disclosure are not limited to the specific embodiments and should be construed as including all changes and/or equivalents or substitutes included in the ideas and technological scopes of the exemplary embodiments of the present disclosure. In the explanation of the drawings, similar reference numerals are used for similar components.

The term "include" or "may include" used in the exemplary embodiments of the present disclosure indicates the presence of disclosed corresponding functions, operations, components, or the like, and does not limit additional one or more functions, operations, components, or the like. In addition, it should be understood that the term "include" or "has" used in the exemplary embodiments of the present disclosure is to indicate the presence of features, numbers, steps, operations, components, parts, or a combination thereof described in the specifications, and does not preclude the presence or addition of one or more other features, numbers, steps, operations, components, parts, or a combination thereof.

The term "or" or "at least one of A or/and B" used in the various exemplary embodiments of the present disclosure includes any and all combinations of the associated listed items. For example, the term "A or B" or "at least one of A or/and B" may include (1) at least one A, (2) at least one B, or (3) both at least one A and at least one B.

Although the terms such as "first" and "second" used in the various exemplary embodiments of the present disclosure may modify various components of the various exemplary embodiments, these terms do not limit the corresponding components. For example, these terms do not limit an order and/or importance of the corresponding components. These terms may be used for the purpose of distinguishing one component from another component. For example, a first user device and a second user device all indicate user devices or may indicate different user devices. For example, a first component may be named as a second component without departing from the right scope of the various exemplary embodiments of the present disclosure, and similarly, a second component may be named as a first component.

When it is described that a component (such as a first component) is "operatively or communicatively coupled" to or "connected" to another component (such as a second component), the component can be directly connected to the other component or can be connected to the other component through a third component. However, when it is described that a component (such as a first component) is "directly connected" or "directly coupled" to another component (such as a second component), it means that there is no intermediate component (such as a third component) between the component and the other component.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

The terms used in the various exemplary embodiments of the present disclosure are for the purpose of describing particular exemplary embodiments only and are not intended to be limiting. As used herein, the singular forms are intended to include the plural forms as well, unless the context clearly indicates otherwise.

Unless defined otherwise, all terms used herein have the same meanings as generally understood by those having ordinary knowledge in the technical field to which the present disclosure pertains. Terms generally used and defined in dictionaries should be interpreted as having meanings consistent with meanings construed in the context of the related art, and should not be interpreted as having ideal or excessively formal meanings unless defined explicitly in this application. Depending on circumstances, terms defined in this document may not be interpreted as excluding embodiments of the present disclosure.

An electronic device according to various embodiments of the present disclosure may include at least one of a smart phone, a tablet Personal Computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), an Moving Picture Experts Group 1 Audio Layer-3 (MP3) player, mobile medical equipment, an electronic bracelet, an electronic necklace, an electronic appcessory, a camera, a wearable device (e.g., a smart glass, a Head-Mounted Device (HMD)), an electronic cloth, an electronic bracelet, an electronic necklace, an electronic appcessory, an electronic tattoo, a smart mirror, and a smart watch.

According to some embodiments, the electronic device may be a smart home appliance. The electronic device may include, for example, a Television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to some embodiments, the electronic device may include at least one of various medical equipment (e.g., various portable medical measurement equipment (a blood sugar measurement device, a heartbeat measurement device, a blood pressure measurement device, or a body temperature measurement device), a Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (e.g., navigation system and gyro compass for ships), avionics, a security device, a vehicle head unit, an industrial or home robot, an Automatic Teller's Machine (ATM), a Point of Sales (POS), or Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, or electric wave measuring device). The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device (e.g., an artificial intelligence electronic device).

FIG. 1 is a block diagram of a network environment 100 including an electronic device 101 according to various embodiments of the present disclosure.

Referring to FIG. 1, an electronic device 101 in a network environment 100 according to various embodiments of the present disclosure will be described. The electronic device 101 may include a bus 110, a processor 120, a memory 130, an Input/Output (I/O) interface 150, a display 160, and a communication interface 170. According to some embodiments, at least one of the foregoing components 110 through 170 may be optional for the electronic device 101. According to some embodiments, the electronic device 101 may further include other components.

The bus 110 may include a circuit for interconnecting the components 110 through 170 of the electronic device 101 and for allowing communication (e.g., a control message and/or data) between the components 110 through 170 described above.

The processor 120 may include one or more of a Central Processing Unit (CPU), an Application Processor (AP), and a Communication Processor (CP). The processor 120 performs operations or data processing for control and/or communication of, for example, at least one other components of the electronic device 101.

The memory 130 may include a volatile and/or nonvolatile memory. The memory 130 may store, for example, commands or data associated with at least one other components of the electronic device 101. According to an embodiment of the present disclosure, the memory 130 may store software and/or a program 140. The program 140 may include, for example, a kernel 141, middleware 143, an Application Programming Interface (API) 145, and/or an application program (or an application) 147. At least some of the kernel 141, the middleware 143, and the API 145 may be referred to as an Operating System (OS). In some embodiments, the application program 147 may be referred to a plurality of application programs, applications, or programs 147.

The kernel 141 controls or manages, for example, system resources (e.g., the bus 110, the processor 120, or the memory 130) used to execute an operation or a function implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In regard to task requests received from the application program 147, the middleware 143 performs control (e.g., scheduling or load balancing) with respect to the task requests, for example, by giving priorities for using a system resource (e.g., the bus 110, the processor 120, or the memory 130) of the electronic device 101 to at least one of the application programs 147.

The API 145 is, for example, an interface used for the application 147 to control a function provided by the kernel 141 or the middleware 143, and may include, for example, at least one interface or function (e.g., a command) for file control, window control, image processing or character control.

The I/O interface 150 serves as an interface for delivering a command or data input from a user or another external device to other component(s) of the electronic device 101. The I/O interface 150 may also output a command or data received from other component(s) of the electronic device 101 to a user or another external device.

The display 160 may include, for example, a Liquid Crystal Display (LCD), a Light Emitting Diode (LED) display, an Organic Light Emitting Diode (OLED) display, a Microelectromechanical system (MEMS) display, or an electronic paper display. The display 160 may display various contents (e.g., a text, an image, video, an icon, or a symbol) to users. The display 160 may include a touch screen, and receives a touch, a gesture, proximity, or a hovering input, for example, by using an electronic pen or a part of a body of a user.

The communication interface 170 sets up communication, for example, between the electronic device 101 and an external device (e.g., a first external electronic device 102, a second external electronic device 104, or a server 106). For example, the communication interface 170 is connected to a network 162 through wireless or wired communication to communicate with the external device (e.g., the second external electronic device 104 or the server 106).

The wireless communication may include at least one of Wireless Fidelity (WiFi), Bluetooth (BT), Near Field Communication (NFC), Global Positioning System (GPS), and a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of a USB (universal serial bus), a Universal Asynchronous Receiver/Transmitter (UART), a Mobile High-Definition Link (MHL), a High Definition Multimedia Interface (HDMI), a Recommended Standard (RS)-232, and a Plain Old Telephone Service (POTS).

According to an embodiment of the present disclosure, the network 162 may include a telecommunications network, for example, at least one of a computer network (e.g., a Local Area Network (LAN) or a Wide Area Network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers.

According to various embodiments of the present disclosure, some or all of operations performed by the electronic device 101 may be performed in other one or more electronic devices (e.g., the external electronic devices 102, 104 or the server 106). According to an embodiment of the present disclosure, when the electronic device 101 has to perform a function or a service automatically or at a request, the electronic device 101 may request a different electronic device (e.g., the first external electronic device 102, the second external electronic device 104, or the server 106) to execute at least some functions associated with the function or the service, in place of or in addition to executing the function or the service. The different electronic device (e.g., the first external electronic device 102, the second external electronic device 104, or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

Figure 2:
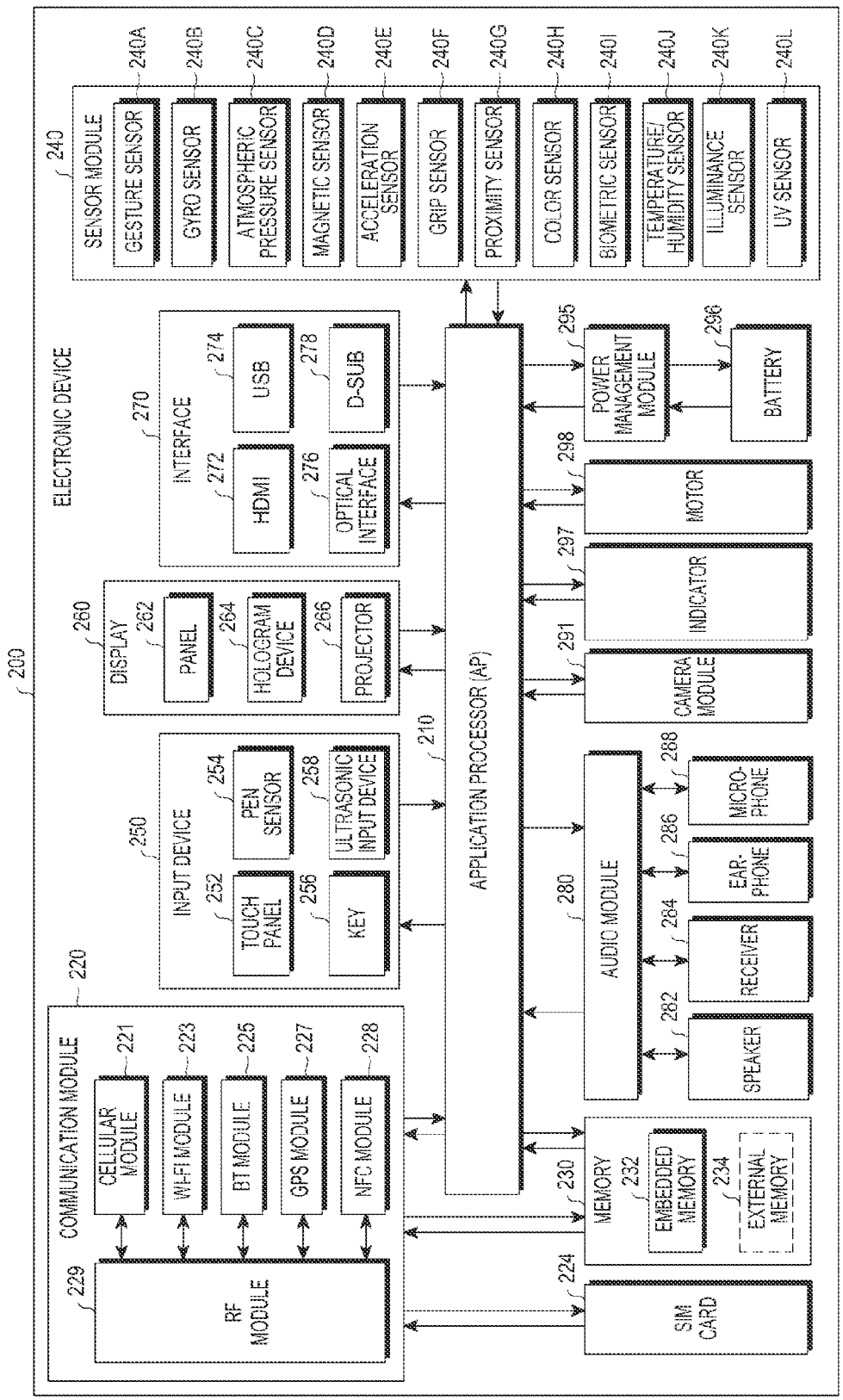
FIG. 2 is a block diagram of an electronic device according to various embodiments of the present disclosure.

FIG. 2 is a block diagram of an electronic device 200 according to various embodiments of the present disclosure.

Referring to FIG. 2, the electronic device 200 may include a whole or a part of, for example, the electronic device 101 illustrated in FIG. 1. The electronic device 200 may include one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls multiple hardware or software components connected to the AP 210 or performs various data processing or operations, for example, by driving an OS or an application program (e.g., the application program 147). The AP 210 may be implemented, for example, with a System on Chip (SoC). According to an embodiment of the present disclosure, the AP 210 may further include a Graphic Processing Unit (GPU) and/or an Image Signal Processor (ISP). The AP 210 may include at least some (e.g., a cellular module 221) of the components illustrated in FIG. 2. The AP 210 loads a command or data received from at least one of other components (e.g., a nonvolatile memory) into a volatile memory that may be included in the memory 230 to process the command or data, and stores various data in the nonvolatile memory.

The communication module 220 may have a configuration that is the same as or similar to that of the communication interface 170 of FIG. 1. The communication module 220 may include, for example, the cellular module 221, a Wireless Fidelity (Wi-Fi) module 223, a Bluetooth (BT) module 225, a Global Positioning System (GPS) module 227, a Near Field Communication (NFC) module 228, and a Radio Frequency (RF) module 229.

The cellular module 221 provides voice communication, video communication, a text service, or an Internet service over a communication network. According to one embodiment of the present disclosure, the cellular module 221 performs identification and authentication with respect to the electronic device 200 in a communication network by using a subscriber identification module (e.g., the SIM card 224). According to an embodiment of the present disclosure, the cellular module 221 may perform at least some of functions that may be provided by the AP 210. According to an embodiment, the cellular module 821 may include a Communication Processor (CP).

Each of the Wi-Fi module 223, the BT module 225, the GPS module 227, and the NFC module 228 may include a processor for processing data transmitted and received therethrough. According to some embodiments, at least some (e.g., two or more) of the cellular module 221, the Wi-Fi module 223, the BT module 225, the GPS module 227, and the NFC module 228 may be integrated into a single Integrated Chip (IC) or IC package.

The RF module 229 transmits and receives, for example, a communication signal (e.g., an RF signal). The RF module 229 may include, for example, a transceiver, a Power Amplifier Module (PAM), a frequency filter, a Low Noise Amplifier (LNA), or an antenna. According to another embodiment of the present disclosure, at least one of the cellular module 221, the Wi-Fi module 223, the BT module 225, the GPS module 227, and the NFC module 228 transmits and receives an RF signal through the separate RF module.

The SIM card 224 may include, for example, a card including an SIM and/or an embedded SIM, and may include unique identification information (e.g., an Integrated Circuit Card Identifier (ICCID)) or subscriber information (e.g., an International Mobile Subscriber Identity (IMSI)).

The memory 230 may include, for example, an embedded memory 232 or an external memory 234. The embedded memory 232 may include, for example, at least one of a volatile memory (e.g., a Dynamic Random Access Memory (DRAM) or Synchronous Dynamic RAM (SDRAM), a nonvolatile memory (e.g., an One Time Programmable ROM (OTPROM), a Programmable ROM (PROM), an Erasable and Programmable ROM (EPROM), an Electrically Erasable and Programmable ROM (EEPROM), a mask ROM, a flash ROM, or a flash memory (such as a NOT AND (NAND) flash or a NOT OR (NOR) flash), a hard drive, and a Solid State Drive (SSD).

The external memory 234 may further include a flash drive, for example, a Compact Flash (CF), a Secure Digital (SD), a micro-Secure Digital (SD), a mini-SD, an Extreme Digital (xD), or a memory stick. The external memory 234 may be functionally and/or physically connected with the electronic device 200 through various interfaces.

The sensor module 240 measures a physical amount or senses an operation status of the electronic device 200 to convert the measured or sensed information into an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illumination sensor 240K, and an Ultra Violet (UV) sensor 240L. Additionally or alternatively, the sensor module 240 may further include an E-nose sensor, an Electromyography (EMG) sensor, an Electroencephalogram (EEG) sensor, an Electrocardiogram (ECG) sensor, an Infrared (IR) sensor, an iris sensor, and/or a fingerprint sensor. The sensor module 240 may further include a control circuit for controlling at least one sensors included therein. In some embodiments, the electronic device 200 may further include a processor configured to control the sensor module 240 as a part of or separately from the AP 210, to control the sensor module 240 when the AP 210 is in a sleep status.

The input device 250 may include, for example, a touch panel 252, a (digital) pen sensor 254, a key 256, or an ultrasonic input device 258. The touch panel 252 may use, for example, at least one of a capacitive type, a resistive type, an IR type, and an ultrasonic type. The touch panel 252 may further include a control circuit. The touch panel 252 may further include a tactile layer to provide tactile reaction to a user.

The (digital) pen sensor 254 may be, for example, a part of the touch panel 252 or a separate recognition sheet. The key 256 may include, for example, a physical button, an optical key, or a keypad. The ultrasonic input device 258 may use an input tool that generates an ultrasonic signal and enable the electronic device 200 to determine data by detecting the ultrasonic signal to a microphone (e.g., the microphone 288), thereby enabling wireless recognition.

The display 260 (e.g., the display 160) may include a panel 262, a hologram device 264, or a projector 266. The panel 262 may have a configuration that is the same as or similar to that of the display 160 of FIG. 1. The panel 262 may be implemented as, for example, being flexible, transparent, or wearable. The panel 262 may be configured as a single module with the touch panel 252. The hologram device 264 shows a stereoscopic image in the air by using interference of light. The projector 266 displays an image by projecting light onto a screen that may be positioned, for example, inside or outside the electronic device 200. According to an embodiment of the present disclosure, the display 260 may further include a control circuit for controlling the panel 262, the hologram device 264, or the projector 266.

The interface 270 may be, for example, a High-Definition Multimedia Interface (HDMI) 272, a Universal Serial Bus (USB) 274, an optical interface 276, or a D-subminiature (sub) 278. The interface 270 may be included in, for example, the communication interface 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) standard interface.

The audio module 280, for example, interchangeably converts sound and an electric signal. At least some components of the audio module 280 may be included in, for example, the I/O interface 150 illustrated in FIG. 1. The audio module 280 may process sound information that is input or output through the speaker 282, the receiver 284, the earphone 286, or the microphone 288.

The camera module 291 is a device capable of capturing a still image and a moving image, and according to an embodiment, may include one or more image sensors (e.g., a front sensor or a rear sensor), a lens, an ISP, or a flash (e.g., an LED or a xenon lamp).

The power management module 295 manages power of the electronic device 200. According to an embodiment, the power management module 295 may include a Power Management Integrated Circuit (PMIC), a charger IC, or a battery or fuel gauge. The PMIC may use a wired and/or wireless charging scheme. The wireless charging scheme may include, for example, a magnetic resonance scheme, a magnetic induction scheme, or an electromagnetic wave scheme, and an additional circuit for wireless charging, for example, a coil loop, a resonance circuit, or a rectifier may be further included. The battery gauge measures the remaining capacity of the battery 296, and a voltage, a current, or a temperature of the battery 296 during charging. The battery 296 may include, for example, a rechargeable battery and/or a solar battery.

The indicator 297 displays a specific status, such as a booting status, a message status, or a charging status, of the electronic device 200 or a part thereof (e.g., the AP 210). The motor 298 converts an electric signal into mechanical vibration, and generates vibration or a haptic effect. Although not shown, a processing device (e.g., a Graphic Processing Unit (GPU)) for supporting a mobile TV may be included. The processing device for supporting the mobile TV processes media data complying with the standard such as Digital Multimedia Broadcasting (DMB), Digital Video Broadcasting (DVB), or a media flow.

Each of the foregoing elements of the electronic device 200 may be configured with one or more components, names of which may vary with a type of the electronic device 200. In various embodiments, the electronic device 200 may include at least one of the foregoing elements, some of which may be omitted or to which other elements may be added. In addition, some of the elements of the electronic device 200 according to various embodiments may be integrated into one entity to perform functions of the corresponding elements in the same manner as before they are integrated.

Figure 3:
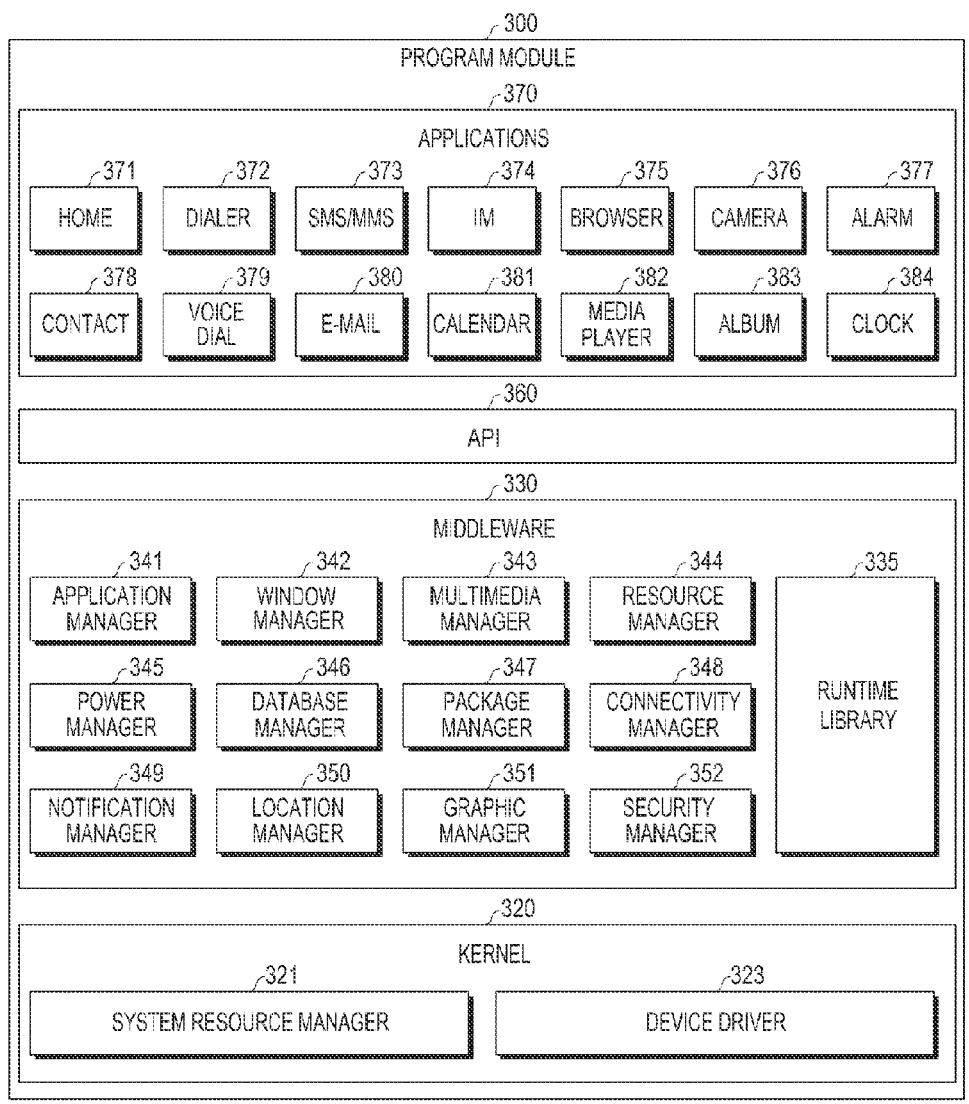
FIG. 3 is a block diagram of a program module according to various embodiments of the present disclosure.

FIG. 3 is a block diagram of a program module 300 according to various embodiments of the present disclosure.

Referring to FIG. 3, according to an embodiment of the present disclosure, the program module 300 (e.g., the program 140) may include an OS for controlling resources related to an electronic device (e.g., the electronic device 101 of FIG. 1) and/or various applications (e.g., the application programs 147) driven on the OS. For example, the OS may be Android™, iOS™, Windows™, Symbian™, Tizen™, Bada™, or the like.

The program module 300 may include a kernel 320, middleware 330, an API 360, and/or applications 370. At least a part of the program module 300 may be preloaded on an electronic device (e.g., the electronic device 101 of FIG. 1) or may be downloaded from a server (e.g., the server 106).

The kernel 320 (e.g., the kernel 141) may include a system resource manager 321 and/or a device driver 323. The system resource manager 321 controls, allocates, or collects system resources. The system resource manager 321 may include, for example, a process manager, a memory manager, and a file system manager. The device driver 323 may include, for example, a display driver, a camera driver, a Bluetooth driver, a shared memory driver, a USB driver, a keypad driver, a WiFi driver, an audio driver, or an Inter-Process Communication (IPC) driver.

The middleware 330 provides functions commonly necessary for the applications 370, or provides various functions to the applications 370 through the API 360 such that the applications 370 may efficiently use restricted system resources within the electronic device (e.g., the electronic device 101 of FIG. 1). According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language during execution of one of the applications 370. According to an embodiment, the runtime library 335 may perform an input/output, memory management, and/or a function for an arithmetic function.

The application manager 341 manages a life cycle of at least one of the applications 370. The window manager 342 manages Graphical User Interface (GUI) resources used by a screen. The multimedia manager 343 detects formats used for reproduction of various media files, and performs encoding and/or decoding of a media file by using a codec suitable for the corresponding format. The resource manager 344 manages resources such as a source code, a memory, and a storage space of at least one of the applications 370.

The power manager 345 manages a battery and/or power, while operating together with a Basic Input/Output System (BIOS), and provides power information used for operation. The database manager 346 manages generation, search, and/or change of a database to be used by at least one of the applications 370. The package manager 347 manages installation and/or an update of an application distributed in a form of a package file.

For example, the connectivity manager 348 manages wireless connectivity such as Wi-Fi or Bluetooth. The notification manager 349 displays and/or notifies an event, such as an arrival message, a promise, a proximity notification, and the like, in such a way not to disturb a user. The location manager 350 manages location information of an electronic device (e.g., the electronic device 101 of FIG. 1). The graphic manager 351 manages a graphic effect which will be provided to a user, and/or a user interface related to the graphic effect. The security manager 352 provides all security functions used for system security and/or user authentication. According to an embodiment, when an electronic device (e.g., the electronic device 101), has a telephone call function, the middleware 330 may further include a telephony manager (not illustrated) for managing a voice and/or video communication function of the electronic device (e.g., the electronic device 101 of FIG. 1).

The middleware 330 may include a middleware module that forms a combination of various functions of the aforementioned components. The middleware 330 provides modules specialized according to types of OSs in order to provide differentiated functions. Further, the middleware 330 dynamically removes some of the existing components and/or adds new components.

The API 360 (e.g., the API 145) is a set of API programming functions, and may be provided with a different configuration according to the OS. For example, in a case of Android™ or iOS™, one API set may be provided for each of platforms, and in a case of Tizen™, two or more API sets may be provided for each platform.

The applications 370 (e.g., the application program 147) may include, for example, a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, a clock application 384, and one or more applications capable of providing a function such as health care (e.g., measurement of an exercise volume or blood sugar) or providing of environment information (e.g., atmospheric pressure, humidity, or temperature information).

According to an embodiment, the applications 370 may include an application for supporting information exchange between the electronic device (e.g., the electronic device 101) and an external electronic device (e.g., the first external electronic device 102 or the second external electronic device 104), which will be referred to as an "information exchange application" for convenience. The information exchange application may include, for example, a notification relay application for relaying particular information to the external electronic device (e.g., the first external electronic device 102 or the second external electronic device 104) or a device management application for managing the external electronic device (e.g., the first external electronic device 102 or the second external electronic device 104).

For example, the notification relay application relays notification information generated in the other applications (e.g., the SMS/MMS application, the email application, the health care application, or the environment information application) of the electronic device (e.g., the electronic device 101) to the external electronic device (e.g., the first external electronic device 102 or the second external electronic device 104). The notification relay application receives and provides the notification information from the external electronic device (e.g., the first external electronic device 102 or the second external electronic device 104) to the user. The device management application manages (e.g., installs, deletes, or updates) at least one function (e.g., active/inactive functions of the external electronic device (e.g., the first external electronic device 102 or the second external electronic device 104), or some components, or display brightness, or resolution, control) of the external electronic device communicating with the electronic device (e.g., the electronice device 101 of FIG. 1), the application running on the external electronic device, or a service (e.g., a call service or a messaging service) provided by the external electronic device.

According to an embodiment, the applications 370 may include an application (e.g., a health care application) designated based on an attribute (e.g., a mobile medical device as a type of the electronic device) of the external electronic device (e.g., the first external electronic device 102 or the second external electronic device 104). According to an embodiment, the applications 370 may include an application received from the external electronic device (e.g., the server 106 or the first external electronic device 102 or the second external electronic device 104). According to an embodiment, the applications 370 may include a preloaded application or a third party application that may be downloaded from a server. The names of the components of the program module 300 according to the illustrated embodiment may vary with a type of an OS.

According to various embodiments, at least a part of the program module 300 may be implemented by software, firmware, hardware, or a combination of at least two of them. Further, at least a part of the program module 300 may be implemented by, for example, a processor (e.g., the AP 210). At least a part of the program module 300 may include, for example, a module, a program, a routine, sets of instructions, and a process for performing one or more functions.

Referring back to FIG. 1, in various embodiments of the present disclosure, the electronic device 101 may be a high-performance electronic device, such as a smartphone, and the electronic device 102 may be a limited-performance electronic device, such as a wearable device, which has limited performance when compared to the high-performance electronic device, such as a smartphone. In various embodiments of the present disclosure, the electronic device 101 and the electronic device 102 may interwork to perform authentication through an authentication server that may be the server 106. Herein, the high-performance electronic device 101, such as a smartphone, may be referred to as a 'first electronic device' and the limited-performance electronic device 102, such as a wearable device, may be referred to as a 'second electronic device'.

The processor 120 may perform various operations of an authentication method according to various embodiments of the present disclosure. For example, the processor 120 may transmit a mutual authentication request of the first electronic device 101 and the second electronic device 102 to an authentication server (e.g., the server 106). The processor 120 receives mutual authentication information regarding each of the first electronic device 101 and the second electronic device 102 from the authentication server and stores the received mutual authentication information in each of the first electronic device 101 and the second electronic device 102. The memory 130 stores the mutual authentication information regarding the first electronic device 101. When the reliability of the authentication state between the first electronic device 101 and the second electronic device 102 is maintained, the processor 120 acquires an authentication result with respect to a service using the second electronic device 102 from the authentication server by using the mutual authentication information regarding each of the first electronic device 101 and the second electronic device 102 and provides the acquired authentication result to the second electronic device 102.

A first electronic device (e.g., the electronic device 101 of FIG. 1) according to various embodiments of the present disclosure may include a communication interface (e.g, the communication interface 170 of FIG. 1) configured to communication-connect to a second electronic device (e.g., the electronic device 102) and an authentication server (e.g., the server 106), a memory (e.g, the memory 130 of FIG. 1) configured to store mutual authentication information regarding the first electronic device, and a processor (e.g, the processor 120 of FIG. 1) configured to transmit a mutual authentication request for the first electronic device and the second electronic device to the authentication server, to receive mutual authentication information for each of the first electronic device and the second electronic device from the authentication server, to store the received mutual authentication information in the first electronic device and the second electronic device, to determine whether reliability of an authentication state between the first electronic device and the second electronic device is maintained, to acquire an authentication result for a service using the second electronic device from the authentication server by using the mutual authentication information for each of the first electronic device and the second electronic device, when the reliability is maintained, and to provide the authentication result to the second electronic device.

The processor may determine whether the reliability is maintained based on at least one of whether an authorized user is biometrically identified by the second electronic device, whether the second electronic device has been separated from the user after mutual authentication, and whether communication between the first electronic device and the second electronic device has been disconnected after the mutual authentication.

The processor may remove the mutual authentication information stored in each of the first electronic device and the second electronic device, when the reliability is not maintained.

The mutual authentication request may include device Identification (ID) information of the first electronic device, device ID information of the second electronic device, account information, and a password, the mutual authentication information for each of the first electronic device and the second electronic device may include an encrypted token, and the authentication result may include a Uniform Resource Locator (URL) providing an authentication code for the service.

Figure 4:
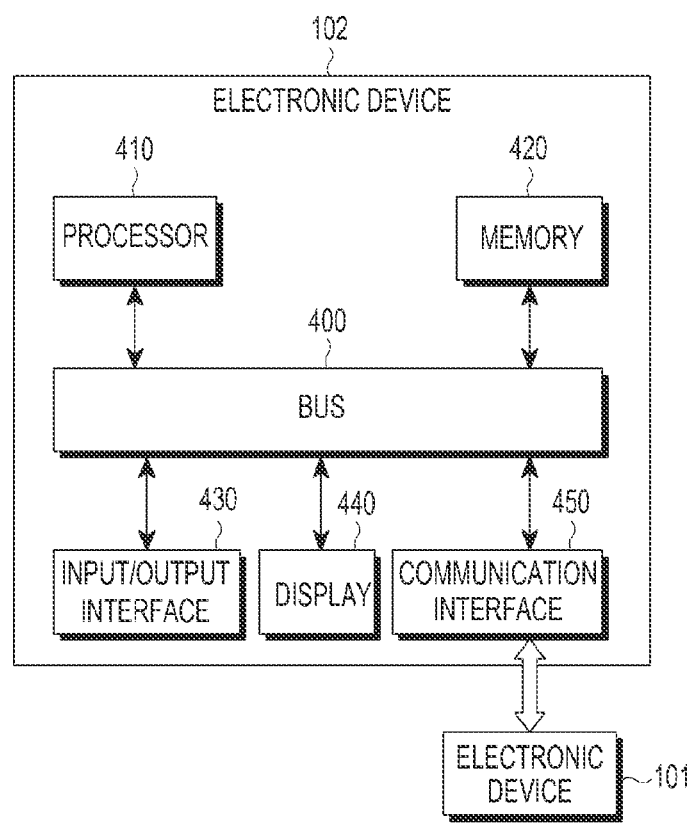
FIG. 4 is a block diagram of an electronic device according to various embodiments of the present disclosure.

FIG. 4 is a block diagram of the electronic device 102 (as shown in FIG. 1) according to various embodiments of the present disclosure.

Referring to FIG. 4, the electronic device 102 may include a bus 400, a processor 410, a memory 420, an I/O interface 430, a display 440, and a communication interface 450. According to some embodiments, at least one of the foregoing components 400 through 450 may be optional for the electronic device 102. According to some embodiments, the electronic device 102 may further include other components.

The bus 400 may include a circuit to interconnect the components 400 through 450 of the electronic device 102 and to enable communication (e.g., a control message and/or data) between the components 400 through 450 described above.

The processor 410 may include a CPU. The processor 410 performs operations or data processing for control and/or communication of, for example, at least one other components of the electronic device 102.

The memory 420 may include a volatile and/or nonvolatile memory. The memory 420 may store, for example, commands or data associated with at least one other components of the electronic device 102. According to an embodiment of the present disclosure, the memory 420 may store software and/or a program.

The I/O interface 430 serves as an interface to deliver a command or data input from a user or another external device to other component(s) of the electronic device 102. The I/O interface 430 may also output a command or data received from other component(s) of the electronic device 102 to a user or another external device. The I/O interface 430 may include a sensor module (not shown). The sensor module may measure a physical quantity or sense an operation state of the electronic device 102 to convert the measured or sensed information into an electric signal. Although not shown, the sensor module may include at least one of a gesture sensor, a gyro sensor, a barometric sensor, a magnetic sensor, an acceleration sensor, a grip sensor, a proximity sensor, a color sensor (for example, RGB sensor), a biometric sensor, a temperature/humidity sensor, an illuminance sensor, a UV sensor, and/or the like. Additionally or alternatively, and although not shown, the sensor module may include an olfactory sensor, an EMG sensor, an EEG sensor, an IR sensor, an iris sensor, a fingerprint sensor, and/or a lock sensor, for example. The lock sensor may sense locking or unlocking of a binding device if the electronic device 102 is a wearable device in a form that may be bound to a body. Furthermore, the sensor module may further include a control circuit for controlling at least one sensor included therein.

The display 440 may include, although not shown, for example, a LCD, a LED display, an OLED display, a MEMS display, or an electronic paper display. The display 440 may display various contents (e.g., a text, an image, video, an icon, or a symbol) to users. The display 440 may include a touch screen, and receives a touch, a gesture, proximity, or a hovering input, for example, via an electronic pen or a part of a body of a user.

The communication interface 450 sets up communication, for example, between the electronic device 102 and an external device (e.g., the electronic device 101). For example, the communication interface 450 may communicate with the electronic device 101 through wireless communication or wired communication.

The wireless communication may include at least one of WiFi, BT, and NFC. The wired communication may include at least one of a USB, a UART, an MHL, an HDMI, an RS-232, and a POTS.

The processor 410 performs various operations of an authentication method according to various embodiments of the present disclosure. For example, the processor 410 may transmit a mutual authentication request of the first electronic device 101 and the second electronic device 102 to the first electronic device 101. The processor 410 receives the mutual authentication information regarding the second electronic device 102 via mutual authentication information issued by the authentication server (e.g., the server 106) regarding each of the first electronic device 101 and the second electronic device 102 from the first electronic device 101, and stores the received mutual authentication information regarding the second electronic device 102 in the memory 420. The memory 420 stores the mutual authentication information regarding the second electronic device 102. When the reliability of the authentication state between the first electronic device 101 and the second electronic device 102 is maintained, the processor 410 acquires an authentication result with respect to a service using the second electronic device 102 from the authentication server through the first electronic device 101 by using the mutual authentication information regarding the second electronic device 102.

A second electronic device (e.g., the second electronic device 102) according to various embodiments of the present disclosure may include a communication interface (e.g., the communication interface 450) to communication-connect with a first electronic device, a memory (e.g., the memory 420) to store mutual authentication information regarding the second electronic device, and a processor (e.g. the processor 410) to transmit a mutual authentication request for the first electronic device and the second electronic device to the first electronic device, to receive mutual authentication information regarding the second electronic device via mutual authentication information issued by an authentication server for each of the first electronic device and the second electronic device from the first electronic device, to store the received mutual authentication information, to determine whether reliability of an authentication state between the first electronic device and the second electronic device is maintained, and to acquire an authentication result for a service using the second electronic device from the authentication server through the first electronic device by using the mutual authentication information regarding the second electronic device, when the reliability is maintained.

The second electronic device may further include a biometric sensor (e.g., the input/output interface 430) to sense a biometric signal of a user, in which the processor determines whether the reliability is maintained based on at least one of whether an authorized user is biometrically identified by the biometric sensor, whether the second electronic device has been separated from the user after mutual authentication, and whether communication between the first electronic device and the second electronic device has been disconnected after the mutual authentication.

The processor may remove the mutual authentication information stored in the second electronic device, when the reliability is not maintained.

The mutual authentication request may include device Identification (ID) information of the second electronic device, the mutual authentication information may include an encrypted token, and the authentication result may include an authentication code acquired by the first electronic device from a Uniform Resource Locator (URL) providing the authentication code for the service.

Figure 5:
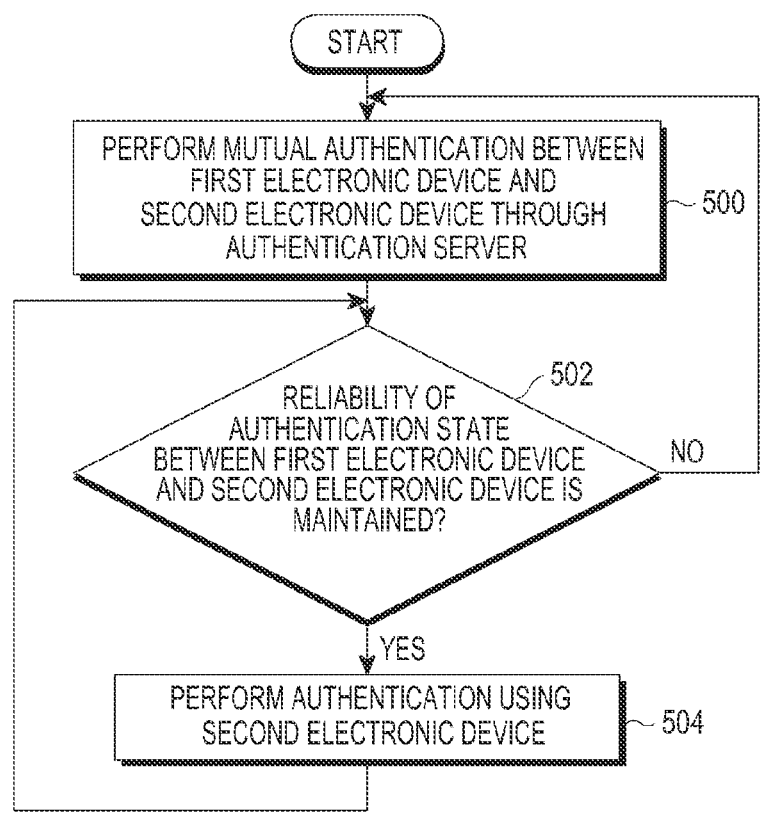
FIG. 5 is a flowchart illustrating an example of an authentication process according to various embodiments of the present disclosure.

FIG. 5 is a flowchart illustrating an example of an authentication process according to various embodiments of the present disclosure.

Referring to FIG. 5, operations 500, 502, and 504 may be performed by the first electronic device 101 (of FIG. 1) and the second electronic device 102 (of FIG. 4) when users of the first electronic device 101 and the second electronic device 102 execute authentication applications included in the first electronic device 101 and the second electronic device 102, respectively. For example, the authentication application may be an application that executes the authentication process according to operations illustrated in FIG. 5. The user may execute an authentication application of each of the first electronic device 101 and the second electronic device 102 through at least one of an I/O interface (e.g., the input/output interface 150) of the first electronic device 101 and an I/O interface of the second electronic device 102 (e.g., the input/output interface 430 of FIG. 4).

In operation 500, the first electronic device 101 and the second electronic device 102 may perform mutual authentication between the first electronic device 101 and the second electronic device 102 through the authentication server. The authentication server may be the server 106 illustrated in FIG. 1. A detailed description of operation 500 will be provided with reference to FIG. 6.

In operation 502, the first electronic device 101 and the second electronic device 102 determines whether reliability of an authentication state between the first electronic device 101 and the second electronic device 102 is maintained. A detailed description of operation 502 will be provided with reference to FIG. 7.

When the reliability of the authentication state between the first electronic device 101 and the second electronic device 102 is not maintained in operation 502, the first electronic device 101 and the second electronic device 102 may perform operation 500 again. When the reliability of the authentication state between the first electronic device 101 and the second electronic device 102 is maintained in operation 502, the first electronic device 101 and the second electronic device 102 may perform operation 504.

In operation 504, the first electronic device 101 and the second electronic device 102 perform authentication using the second electronic device 102. A detailed description of operation 504 will be provided with reference to FIG. 8.

Figure 6:
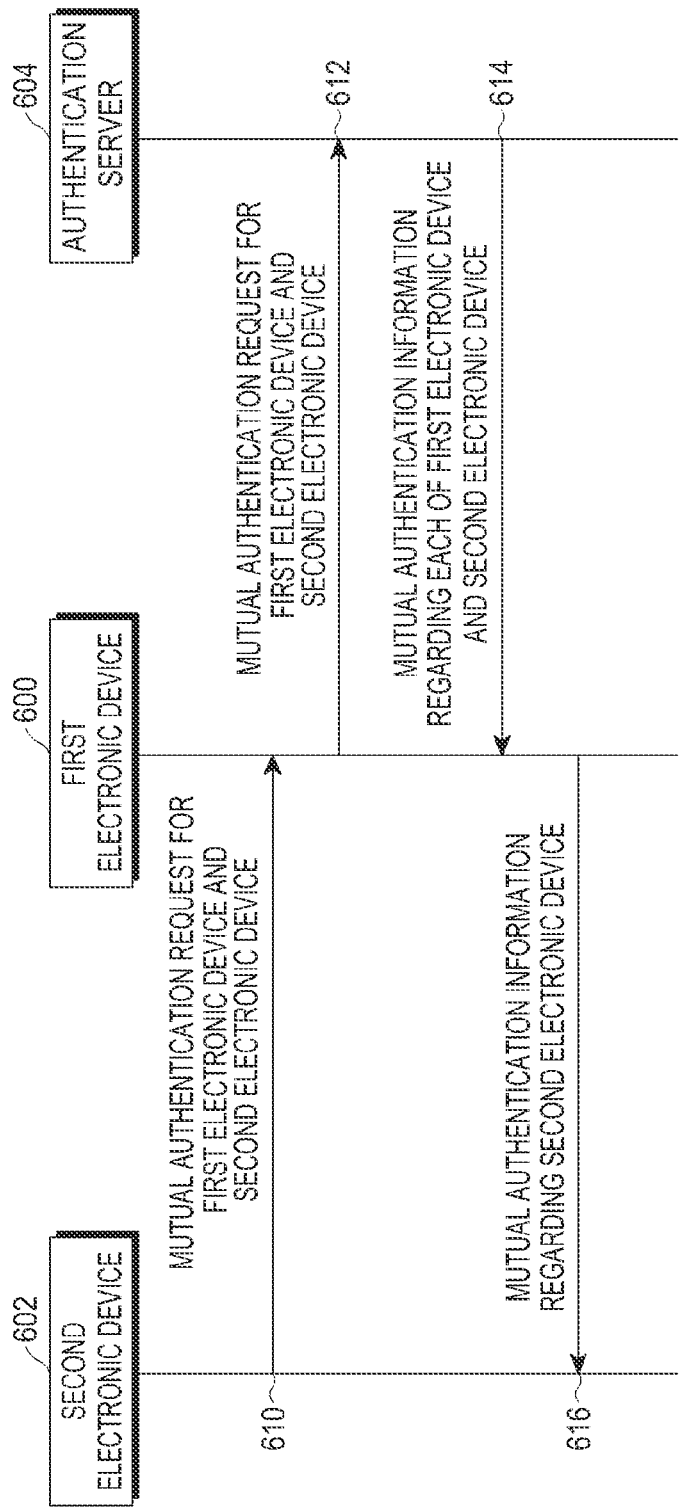
FIG. 6 is a ladder diagram illustrating an example of mutual authentication between a first electronic device and a second electronic device according to various embodiments of the present disclosure.

FIG. 6 is a ladder diagram illustrating an example of mutual authentication between the first electronic device 600 and the second electronic device 602 according to various embodiments of the present disclosure.

Referring to FIG. 6, the first electronic device 600 may be a smartphone, which may be configured equally or similarly to the electronic device 101 of FIG. 1. The second electronic device 602 may be a wearable device, which may be configured equally or similarly to the electronic device 102 of FIG. 1. An authentication server 604 may be the server 106 of FIG. 1.

In operation 610, the second electronic device 602 transmits a mutual authentication request for the first electronic device 600 and the second electronic device 602 to the first electronic device 600. The mutual authentication request transmitted by the second electronic device 602 to the first electronic device 600 may include device ID information of the second electronic device 602. The device ID information of the second electronic device 602 may be unique information designated to identify the second electronic device 602 from other electronic devices. For example, the device ID information of the second electronic device 602 may be stored in the second electronic device 602 by a manufacturer of the second electronic device 602. For example, the device ID information of the second electronic device 602 may be designated as 'MSIP-SDWF-SDDW-SDFE'.

Upon receiving the mutual authentication request from the second electronic device 602 in operation 610, the first electronic device 600 transmits the mutual authentication request for the first electronic device 600 and the second electronic device 602 to the authentication server 604 in operation 612. The mutual authentication request transmitted by the first electronic device 600 to the authentication server 604 may include the device ID information of the first electronic device 602, the device ID information of the second electronic device 600, account information, and a password. The device ID information of the first electronic device 600 may be unique information designated to identify the first electronic device 600 from other electronic devices. For example, the device ID information of the first electronic device 600 may be stored in the first electronic device 600 by a manufacturer of the first electronic device 600. For example, the device ID information of the first electronic device 600 may be designated as 'AFGVADFGFGREG'. The account information may be an ID of an account generated for a service to be used by the users of the first electronic device 600 and the second electronic device 602 through authentication. The password may be set by the user for the account. For example, the account information may be 'Samsung' and the password may also be 'Samsung'. The account information and the password may be input to the first electronic device 600 by the users of the first electronic device 600 and the second electronic device 602.

Upon receiving the mutual authentication request from the first electronic device 600 in operation 612, the authentication server 604 issues mutual authentication information regarding each of the first electronic device 600 and the second electronic device 602 and transmits the issued mutual authentication information to the first electronic device 600 in operation 614. The mutual authentication information regarding each of the first electronic device 600 and the second electronic device 602 may be an encrypted token. For example, the encrypted token issued as the mutual authentication information regarding the first electronic device 600 by the authentication server 604 may be 'awer23ader' and the encrypted token issued as the mutual authentication information regarding the second electronic device 602 may be 'haw3t23fer23'. The authentication server 604 stores the device ID information of each of the first electronic device 600 and the second electronic device 602, the encrypted token issued for each of the first electronic device 600 and the second electronic device 602, an encryption key used to generate the encrypted tokens, the account information, and the password in a database by mapping them to each other as shown in Table 1.

TABLE 1

| Token of Second Electronic Device | Token of First Electronic Device | Encryption Key |
|---|---|---|
| haw3t23fer23 | awer23ader | hrtrvqwe34a |
| Device ID Information of Second Electronic Device | Device ID Information of First Electronic Device | Account/ Password |
| MSIP-SDWF-SDDW-SDFE | AFGVADFGFGREG | Samsung/ Samsung |

In operation 614, the first electronic device 600 receives the mutual authentication information regarding each of the first electronic device 600 and the second electronic device 602 from the authentication server 604. The first electronic device 600 may store the mutual authentication information regarding the first electronic device 600 out of the mutual authentication information regarding each of the first electronic device 600 and the second electronic device 602 in a memory (e.g., the memory 130 of FIG. 1). In operation 616, the first electronic device 600 transmits the mutual authentication information regarding the second electronic device 602 to the second electronic device 602.

Upon receiving the mutual authentication information regarding the second electronic device 602 from the first electronic device 600 in operation 616, the second electronic device 602 stores the mutual authentication information regarding the second electronic device 602 in a memory (e.g., the memory 420 of FIG. 4) in operation 616. The mutual authentication information stored in the first electronic device 600 and the second electronic device 602, respectively, may be used to acquire an authentication result with respect to a service requiring authentication using the second electronic device 602 (e.g., payment, a membership service, permission of entry, and so forth) from the authentication server 604.

After mutual authentication is performed between the first electronic device 600 and the second electronic device 602, to determine whether the user of the second electronic device 602 is an authorized user, it may be continuously determined whether the reliability of the authentication state between the first electronic device 600 and the second electronic device 602 is maintained. The authorized user may be a user that has been mutually authenticated between the first electronic device 600 and the second electronic device 602 by the authentication server 604.

Figure 7:
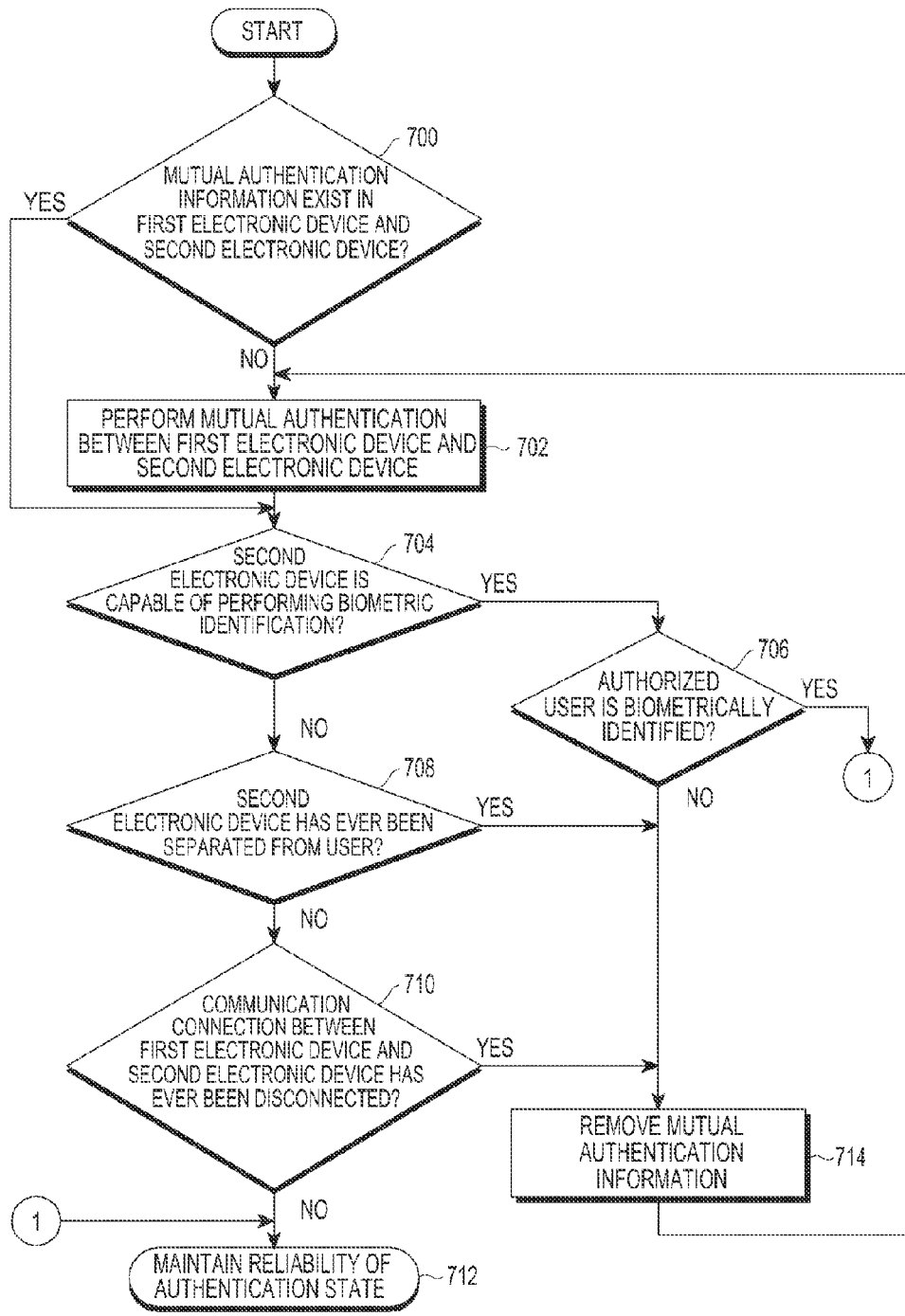
FIG. 7 is a flowchart illustrating an example for determining whether the reliability of an authentication state between a first electronic device and a second electronic device is maintained according to various embodiments of the present disclosure.

FIG. 7 is a flowchart illustrating an example for determining whether the reliability of an authentication state between the first electronic device 600 (of FIG. 6) and the second electronic device 602 (of FIG. 6) is maintained according to various embodiments of the present disclosure.

Referring to FIG. 7, in operation 700, the first electronic device 600 and the second electronic device 602 determine whether the mutual authentication information regarding each of the first electronic device 600 and the second electronic device 602 exists in a memory (e.g. the memory 130 of FIG. 1) of the first electronic device 600 and a memory (e.g. the memory 420 of FIG. 4) of the second electronic device 602, respectively. When the mutual authentication information regarding the first electronic device 600, and the mutual authentication information regarding the second electronic device 602, do not exist in the first electronic device 600 and the second electronic device 602, respectively, then the first electronic device 600 and the second electronic device 602 perform mutual authentication therebetween in operation 702. Operation 702 may be performed as shown in FIG. 6.

When the mutual authentication information regarding the first electronic device 600 and the mutual authentication information regarding the second electronic device 602 exist in the first electronic device 600 and the second electronic device 602, respectively, in operation 700, or operation 702 is performed, the mutual authentication information regarding the first electronic device 600 and the mutual authentication information regarding the second electronic device 602 may be stored in the first electronic device 600 and the second electronic device 602 and then operation 704 may be performed.

In operation 704, the first electronic device 600 and the second electronic device 602 determine whether the second electronic device 602 is capable of performing biometric identification. The second electronic device 602 may include a biometric identification function capable of performing biometric identification by sensing a biometric signal of a user through a biometric sensor (e.g., a biometric sensor included in the I/O interface 430 of FIG. 4). For example, the biometric signal may be a signal that is a result of sensing or scanning at least one of an iris and a fingerprint of the user.

When the second electronic device 602 is capable of performing biometric recognition in operation 704, it is determined in operation 706 whether an authorized user is biometrically identified by the second electronic device 602. A biometric signal of the authorized user may be a biometric signal of a user registered in the first electronic device 600 or the second electronic device 602. When the authorized user is biometrically identified in operation 706, then the first electronic device 600 and the second electronic device 602 perform operation 712. When the authorized user is not biometrically identified in operation 706, the first electronic device 600 and the second electronic device 602 perform operation 714.

Referring back to operation 704, when the second electronic device 602 is not capable of performing biometric identification, the first electronic device 600 and the second electronic device 602 determine whether the second electronic device 602 is separated from the user after mutual authentication in operation 708. The second electronic device 602 may sense whether it is worn on or held by the user by using a proximity sensor, a lock sensor, or the like. When the user does not wear or hold the second electronic device 602, the second electronic device 602 may determine that it is separated from the user. When the second electronic device 602 has been separated from the user, then it may be determined that the second electronic device 602 may be stolen, lost, or used by a unauthorized user.

When the second electronic device 602 has not been separated from the user in operation 708, the first electronic device 600 and the second electronic device 602 may perform operation 710. When the second electronic device 602 has been separated from the user in operation 708, then the first electronic device 600 and the second electronic device 602 may perform operation 714.

In operation 710, the first electronic device 600 and the second electronic device 602 determine whether communication between the first electronic device 600 and the second electronic device 602 has been disconnected after mutual authentication therebetween. When communication between the first electronic device 600 and the second electronic device 602 has not been disconnected in operation 710, then the first electronic device 600 and the second electronic device 602 perform operation 712. When communication between the first electronic device 600 and the second electronic device 602 has been disconnected in operation 710, then the first electronic device 600 and the second electronic device 602 perform operation 714. When communication between the first electronic device 600 and the second electronic device 602 has been disconnected, it may mean that the second electronic device 602 may be stolen, lost, or used by a unauthorized user.

In operation 712, the first electronic device 600 and the second electronic device 602 determine that the reliability of the authentication state is maintained after mutual authentication. Thus, when the authorized user is biometrically identified by the second electronic device 602 capable of performing biometric identification, or when the second electronic device 602 has not been separated from the user and communication between the first electronic device 600 and the second electronic device 602 has not been disconnected after mutual authentication, then the first electronic device 600 and the second electronic device 602 may determine that the reliability of the authentication state is maintained after mutual authentication.

In operation 714, the first electronic device 600 and the second electronic device 602 determine that the reliability of the authentication state therebetween is not maintained after mutual authentication and remove the mutual authentication information stored in the first electronic device 600 and the second electronic device 602, respectively. Thus, when the authorized user is not biometrically identified by the second electronic device 602 capable of performing biometric identification, or when the second electronic device 602 has been separated from the user and communication between the first electronic device 600 and the second electronic device 602 has been disconnected after mutual authentication, then the first electronic device 600 and the second electronic device 602 may determine that the reliability of the authentication state is not maintained after mutual authentication. The first electronic device 600 and the second electronic device 602 remove the mutual authentication information stored in the first electronic device 600 and the second electronic device 602, respectively, in operation 714, and then perform operation 702 to resume mutual authentication.

Although operations 704, 708, and 710 are included to determine whether the reliability of the authentication state is maintained in the embodiment shown in FIG. 7, other embodiments may determine whether the reliability of the authentication state is maintained based on one or a combination of two or more of operations 704, 708, and 710.

Figure 8:
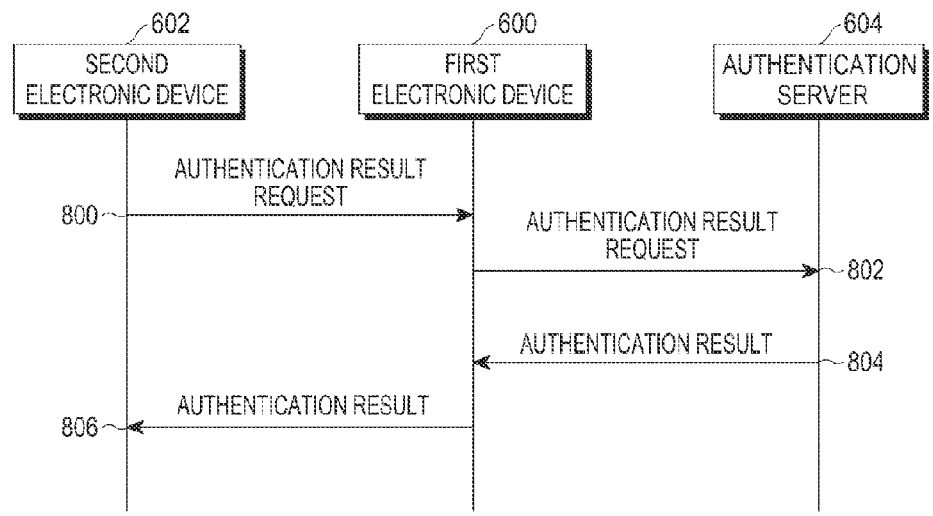
FIG. 8 is a ladder diagram illustrating an example for performing authentication for a service using a second electronic device according to various embodiments of the present disclosure.

FIG. 8 is a ladder diagram illustrating an example for performing authentication for a service using the second electronic device 602 according to various embodiments of the present disclosure.

Referring to FIG. 8, when the user desires to use a service requiring authentication using the second electronic device 602 of FIG. 6 (e.g., payment, a membership service, permission of entry, or the like), the second electronic device 602 transmits an authentication result request to the first electronic device 600 of FIG. 6 in operation 800. The authentication result request transmitted by the second electronic device 602 to the first electronic device 600 may include the device ID information of the second electronic device 602 and an encrypted token of the second electronic device 602 stored as the mutual authentication information.

Upon receiving the authentication result request from the second electronic device 602 in operation 800, the first electronic device 600 transmits the authentication result request to the authentication server 604 of FIG. 6 in operation 802. The authentication result request transmitted by the first electronic device 600 to the authentication server 600 may include the device ID information and the encrypted token of the second electronic device 602, and device ID information and an encrypted token of the first electronic device 600.

Upon receiving the authentication result request from the first electronic device 600 in operation 802, the authentication server 604 compares the encrypted tokens for the first electronic device 600 and the second electronic device 602, which are included in the authentication result requests, with encrypted tokens stored in the database of the authentication server 604 as shown in Table 1 to verify whether the included encrypted tokens are the same as the stored encrypted tokens, in operation 804. When the authentication result request comes from a user other than an authorized user, the encrypted tokens for the first electronic device 600 and the second electronic device 602, which are included in the authentication result requests, are not the same as the encrypted tokens stored in the database of the authentication server 604, failing in token verification. When token verification fails, the authentication server 604 transmits an authentication result indicating an authentication failure to the first electronic device 600 in operation 804. When the authentication result request comes from an authorized user, then the encrypted tokens for the first electronic device 600 and the second electronic device 602, which are included in the authentication result requests, are the same as the encrypted tokens stored in the database of the authentication server 604, succeeding in token verification. When token verification succeeds, the authentication server 604 transmits an authentication result regarding the service using the second electronic device 602 to the first electronic device 600 in operation 804.

Upon receiving the authentication result from the authentication server 604 in operation 804, the first electronic device 600 transmits the authentication result to the second electronic device 602 in operation 806.

Thus, the user may use the service requiring authentication by using the second electronic device 602 interworking with the first electronic device 600.

In an embodiment of the present disclosure, an authentication result may be authentication information indicating payment or permission of entry using the second electronic device 602. In another embodiment of the present disclosure, the authentication result may further include effective time information indicating an effective time that is set for the authentication result. When the effective time elapses, the corresponding authentication result may not be effective. When the effective time is set for the authentication result, the second electronic device 602 may remove the authentication result when the effective time has elapsed.

In another embodiment of the present disclosure, the authentication result may be provided to the second electronic device 602 as an authentication code such as a barcode, a Quick Response (QR) code, or the like. In another embodiment of the present disclosure, the authentication result may be provided to the second electronic device 602 as an authentication code that may be output by the second electronic device through NFC. In this case, the authentication server 604 may provide an authentication result including a Uniform Resource Locator (URL) providing the authentication code to the first electronic device 600 which then acquires the authentication code from the URL and provides the acquired authentication code as the authentication result to the second electronic device 602.

Figure 9:
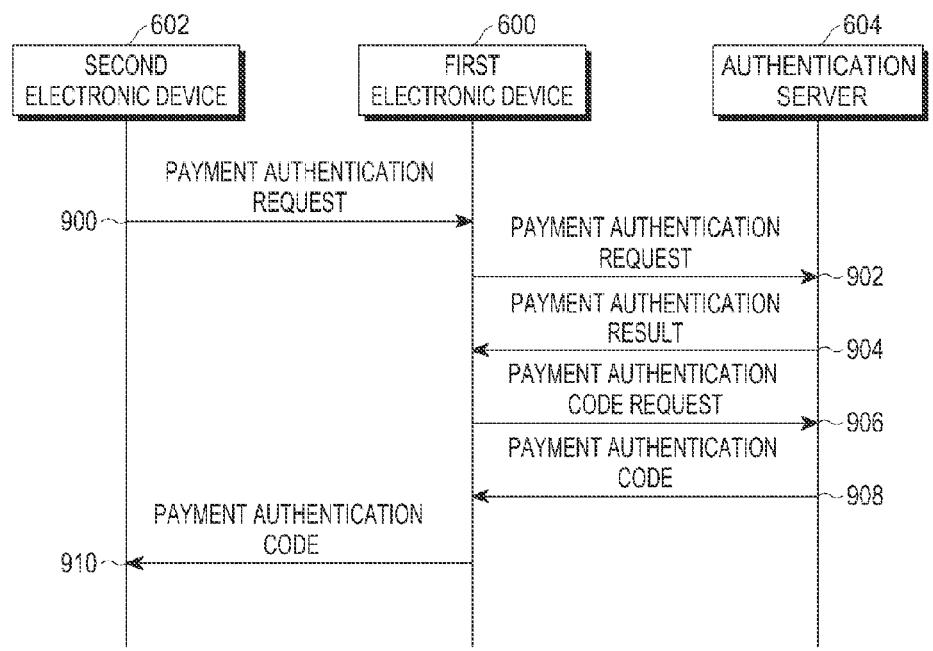
FIG. 9 is a ladder diagram illustrating an example for performing authentication for a payment service using a second electronic device according to various embodiments of the present disclosure.

FIG. 9 is a ladder diagram illustrating an example for performing authentication for a payment service using a second electronic device according to various embodiments of the present disclosure.

Referring to FIG. 9, operations 900 to 910 may be operations of an example for performing authentication for a payment service among various examples for performing authentication for a service requiring authentication using the second electronic device 602 of FIG. 6 according to various embodiments of the present disclosure.

When the user desires to use a payment service that needs authentication using the second electronic device 602, the second electronic device 602 transmits a payment authentication request requesting an authentication result for using the payment service to the first electronic device 600 of FIG. 6 in operation 900. The payment authentication request transmitted from the second electronic device 602 to the first electronic device 600 may include the device ID information of the second electronic device 602 and the encrypted token of the second electronic device 602 stored as the mutual authentication information.

Upon receiving the payment authentication request from the second electronic device 602 in operation 900, the first electronic device 600 transmits the payment authentication request to the authentication server 604 of FIG. 6 in operation 902. The payment authentication request transmitted by the first electronic device 600 to the authentication server 604 may include the device ID information and the encrypted token of the second electronic device 602 and the device ID information and the encrypted token of the first electronic device 600.

Upon receiving the payment authentication request from the first electronic device 600 in operation 902, the authentication server 604 compares the encrypted tokens for the first electronic device 600 and the second electronic device 602, which are included in the payment authentication requests, with encrypted tokens stored in the database of the authentication server 604 as shown in Table 1 to verify whether the included encrypted tokens are the same as the stored encrypted tokens, in operation 904. When the authentication result request comes from a user other than an authorized user, the encrypted tokens for the first electronic device 600 and the second electronic device 602, which are included in the payment authentication requests, are not the same as the encrypted tokens stored in the database of the authentication server 604, failing in token verification. When token verification fails, the authentication server 604 transmits an authentication result indicating an authentication failure to the first electronic device 600 in operation 904. When the payment authentication request comes from an authorized user, then the encrypted tokens for the first electronic device 600 and the second electronic device 602, which are included in the payment authentication requests, are the same as the encrypted tokens stored in the database of the authentication server 604, succeeding in token verification. When token verification succeeds, the authentication server 604 transmits an authentication result regarding the service using the second electronic device 602 to the first electronic device 600 in operation 904. The payment authentication result may include a payment authentication code that may be displayed like a barcode, a QR code, or the like, or an URL providing a payment authentication code that may be output through NFC.

In an embodiment of the present disclosure, the URL providing the payment authentication code may be an URL of the authentication server 604. When the URL providing the payment authentication code is the URL of the authentication server 604, the first electronic device 600 may transmit a payment authentication code request to the URL of the authentication server 604 included in the payment authentication result in operation 906. The authentication server 604 transmits a payment authentication code to the first electronic device 600 in operation 908. The authentication server 604 sets an effective time for the payment authentication code and transmits effective time information indicating the set effective time, together with the payment authentication code, to the first electronic device 600. The first electronic device 600 transmits the payment authentication code received from the authentication server 604 in operation 908 to the second electronic device 602 in operation 910.

In another embodiment of the present disclosure, the URL providing the authentication code may be a URL of a server (not shown) providing the authentication code for the payment service according to the authentication result of the authentication server 604. In this case, the first electronic device 600 transmits the payment authentication code request to the URL of the server included in the authentication result in operation 906. The payment authentication code request transmitted by the first electronic device 600 to the server in operation 906 may include the authentication result indicating an authentication success from the authentication server 604. The server having received the payment authentication code request from the first electronic device 600 transmits the payment authentication code to the first electronic device 600 in operation 908. The server sets the effective time for the payment authentication code and transmits the effective time information indicating the set effective time, together with the payment authentication code, to the first electronic device 600. The first electronic device 600 transmits the payment authentication code received from the server in operation 908 to the second electronic device 602 in operation 910.

The second electronic device 602 may display the payment authentication code received from the first electronic device 600 or output the received payment authentication code through NFC. A payment service provider may perform the payment service by recognizing the authentication code displayed on the screen of the second electronic device 602 in the form of a barcode, a QR code, or the like using a reader (or a scanner) or by checking the authentication code from the second electronic device 602 through NFC. When the effective time has been set in the payment authentication code and the effective time has elapsed, the second electronic device 602 may remove the payment authentication code.

Figure 10A:
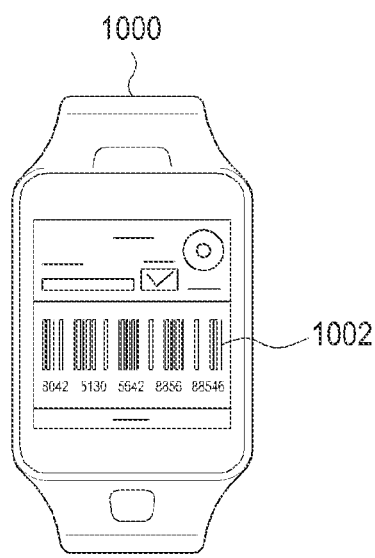
FIGS. 10A and 10B illustrate examples in which a second electronic device displays an authentication code according to an embodiment of the present disclosure.

FIG. 10A illustrates an example in which a second electronic device 1000 (e.g., similar to the second electronic device 102 of FIG. 1) displays an authentication code according to an embodiment of the present disclosure.

Referring to FIG. 10A, the second electronic device 1000 may be an example of a wearable device in the form of a wrist watch. The second electronic device 1000 may display a barcode 1002 as the authentication code.

Figure 10B:
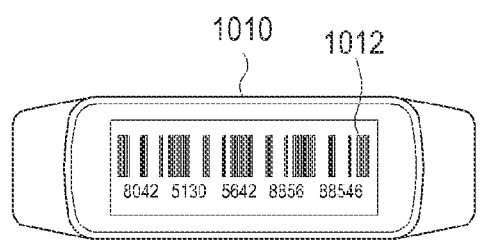

FIG. 10B illustrates an example in which a second electronic device 1010 (e.g., similar to the second electronic device 102 of FIG. 1) displays an authentication code according to an embodiment of the present disclosure.

Referring to FIG. 10B, the second electronic device 1010 may be another example of a wearable device in the form of a wrist watch. The second electronic device 1010 may display a barcode 1012 as the authentication code.

According to various embodiments of the present disclosure, a limited-performance electronic device such as a wearable device and a high-performance electronic device such as a smartphone interwork to perform authentication, and the high-performance electronic device mainly processes an authentication process and the limited-performance electronic device may outputs an authentication result for using a service. In this way, authentication may be performed using the limited-performance electronic device, such that the authentication result is output through the limited-performance electronic device only when the reliability of the authentication state between the limited-performance electronic device and the high-performance electronic device is maintained, while improving usability, thus performing safe and reliable authentication.

An authentication method for a first electronic device according to various embodiments of the present disclosure include transmitting a mutual authentication request for the first electronic device and a second electronic device communication-connected with the first electronic device to an authentication server, receiving mutual authentication information for each of the first electronic device and the second electronic device from the authentication server, storing the received mutual authentication information in the first electronic device and the second electronic device, determining whether reliability of an authentication state between the first electronic device and the second electronic device is maintained, acquiring an authentication result for a service using the second electronic device from the authentication server by using the mutual authentication information for each of the first electronic device and the second electronic device, when the reliability is maintained, and providing the authentication result to the second electronic device.

The determining of whether the reliability is maintained may include determining whether the reliability is maintained based on at least one of whether an authorized user is biometrically identified by the second electronic device, whether the second electronic device has been separated from the user after mutual authentication, and whether communication between the first electronic device and the second electronic device has been disconnected after the mutual authentication.

The determining of whether the reliability is maintained may further include determining that the reliability is maintained, when the authorized user is biometrically identified and determining that the reliability is not maintained, when the authorized user is not biometrically identified.

The determining of whether the reliability is maintained may further include determining that the reliability is maintained, when the second electronic device has not been separated from the user after mutual authentication, and communication between the first electronic device and the second electronic device has not been disconnected after the mutual authentication and determining that the reliability is not maintained, when the second electronic device has been separated from the user after mutual authentication or communication between the first electronic device and the second electronic device has been disconnected after the mutual authentication.

The authentication method may further include removing the mutual authentication information stored in each of the first electronic device and the second electronic device, when the reliability is not maintained.

The mutual authentication request may further include device Identification (ID) information of the first electronic device, device ID information of the second electronic device, account information, and a password, the mutual authentication information for each of the first electronic device and the second electronic device comprises an encrypted token, and the authentication result comprises a Uniform Resource Locator (URL) providing an authentication code for the service.

An authentication method for a second electronic device according to various embodiments of the present disclosure may include transmitting a mutual authentication request for the second electronic device and a first electronic device communication-connected with the electronic device to the first electronic device, receiving mutual authentication information regarding the second electronic device via mutual authentication information issued by an authentication server for each of the first electronic device and the second electronic device from the first electronic device, storing the received mutual authentication information, determining whether reliability of an authentication state between the first electronic device and the second electronic device is maintained, and acquiring an authentication result for a service using the second electronic device from the authentication server through the first electronic device by using the mutual authentication information regarding the second electronic device, when the reliability is maintained.

The determining of whether the reliability is maintained may include determining whether the reliability is maintained based on at least one of whether an authorized user is biometrically identified by the second electronic device, whether the second electronic device has been separated from the user after mutual authentication, and whether communication between the first electronic device and the second electronic device has been disconnected after the mutual authentication.

The determining of whether the reliability is maintained may further include determining that the reliability is maintained, when the authorized user is biometrically identified and determining that the reliability is not maintained, when the authorized user is not biometrically identified.

The determining of whether the reliability is maintained may further include determining that the reliability is maintained, when the second electronic device has not been separated from the user after mutual authentication, and communication between the first electronic device and the second electronic device has not been disconnected after the mutual authentication and determining that the reliability is not maintained, when the second electronic device has been separated from the user after mutual authentication or communication between the first electronic device and the second electronic device has been disconnected after the mutual authentication.

The authentication method may further include removing the mutual authentication information stored in the second electronic device, when the reliability is not maintained.

The mutual authentication request may include device Identification (ID) information of the second electronic device, the mutual authentication information comprises an encrypted token, and the authentication result comprises an authentication code acquired by the first electronic device from a Uniform Resource Locator (URL) providing the authentication code for the service.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

According to various embodiments, some devices (e.g., modules or functions thereof) or methods (e.g., operations) may be implemented with instructions stored in a computer-readable storage medium in a programming module type. When the instructions are executed by one or more processors (e.g., the processor 120 or 410), the one or more processors may perform functions corresponding to the instructions. The computer-readable storage medium may be, for example, a memory included in the memory 130 or 420. At least some of the instructions may be implemented (e.g., executed) by the processors. At least some of the programming modules may include, for example, modules, programs, routines, sets of instructions, or processes for performing one or more functions.

The computer readable recording medium includes Magnetic Media such as hard disk, floppy disk, or magnetic tape, Optical Media such as Compact Disc Read Only Memory (CD-ROM) or Digital Versatile Disc (DVD), magneto-optical media such as floptical disk, and a hardware device such as ROM. RAM, flash memory storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

The electronic device according to an embodiment of the present disclosure may receive and store the program from a program providing device connected in a wired or wireless manner. The program providing device may include a memory for storing a program including instructions for instructing the electronic device to execute the authentication method, information necessary for the authentication method, a communication unit for performing wired or wireless communication with the electronic device, and a controller for transmitting a corresponding program to the electronic device at the request of the electronic device or automatically.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive or heuristic manner. Also, some of the operations may be executed in different order or omitted, or may have additional different operations.

The embodiments disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

What is claimed is:

1. An authentication method for a first electronic device, the authentication method comprising:
    transmitting a mutual authentication request for the first electronic device and a second electronic device communication-connected with the first electronic device to an authentication server;
    receiving mutual authentication information for each of the first electronic device and the second electronic device from the authentication server;
    storing the received mutual authentication information in the first electronic device and the second electronic device;
    determining whether reliability of an authentication state between the first electronic device and the second electronic device is maintained;
    acquiring an authentication result for a service using the second electronic device from the authentication server by using the mutual authentication information for each of the first electronic device and the second electronic device, when the reliability is maintained; and
    providing the authentication result to the second electronic device,
    wherein the mutual authentication request comprises device Identification (ID) information of the first electronic device, device ID information of the second electronic device, account information, and a password, and
    wherein the mutual authentication information for each of the first electronic device and the second electronic device comprises an encrypted token, and
    wherein the authentication result comprises a Uniform Resource Locator (URL) providing an authentication code for the service.

2. The authentication method of claim 1, wherein the determining of whether the reliability is maintained comprises determining whether the reliability is maintained based on at least one of whether an authorized user is biometrically identified by the second electronic device, whether the second electronic device has been separated from the user after mutual authentication, and whether communication between the first electronic device and the second electronic device has been disconnected after the mutual authentication.

3. The authentication method of claim 2, wherein the determining of whether the reliability is maintained further comprises:
    determining that the reliability is maintained, when the authorized user is biometrically identified; and
    determining that the reliability is not maintained, when the authorized user is not biometrically identified.

4. The authentication method of claim 2, wherein the determining of whether the reliability is maintained further comprises:
    determining that the reliability is maintained, when the second electronic device has not been separated from the user after mutual authentication, and communication between the first electronic device and the second electronic device has not been disconnected after the mutual authentication; and determining that the reliability is not maintained, when the second electronic device has been separated from the user after mutual authentication or communication between the first electronic device and the second electronic device has been disconnected after the mutual authentication.

5. The authentication method of claim 1, further comprising removing the stored mutual authentication information from each of the first electronic device and the second electronic device, when the reliability is not maintained.

6. An authentication method for a second electronic device, the authentication method comprising:
   transmitting a mutual authentication request for the second electronic device and a first electronic device communication-connected with the second electronic device to the first electronic device;
   receiving mutual authentication information regarding the second electronic device via mutual authentication information issued by an authentication server for each of the first electronic device and the second electronic device from the first electronic device;
   storing the received mutual authentication information;
   determining whether reliability of an authentication state between the first electronic device and the second electronic device is maintained; and
   acquiring an authentication result for a service using the second electronic device from the authentication server through the first electronic device by using the mutual authentication information regarding the second electronic device, when the reliability is maintained,
   wherein the mutual authentication request comprises device Identification (ID) information of the second electronic device, and
   wherein the mutual authentication information comprises an encrypted token, and
   wherein the authentication result comprises an authentication code acquired by the first electronic device from a Uniform Resource Locator (URL) providing the authentication code for the service.

7. The authentication method of claim 6, wherein the determining of whether the reliability is maintained comprises determining whether the reliability is maintained based on at least one of whether an authorized user is biometrically identified by the second electronic device, whether the second electronic device has been separated from the user after mutual authentication, and whether communication between the first electronic device and the second electronic device has been disconnected after the mutual authentication.

8. The authentication method of claim 7, wherein the determining of whether the reliability is maintained further comprises:
   determining that the reliability is maintained, when the authorized user is biometrically identified; and
   determining that the reliability is not maintained, when the authorized user is not biometrically identified.

9. The authentication method of claim 7, wherein the determining of whether the reliability is maintained further comprises:
   determining that the reliability is maintained, when the second electronic device has not been separated from the user after mutual authentication, and communication between the first electronic device and the second electronic device has not been disconnected after the mutual authentication; and
   determining that the reliability is not maintained, when the second electronic device has been separated from the user after mutual authentication or communication between the first electronic device and the second electronic device has been disconnected after the mutual authentication.

10. The authentication method of claim 6, further comprising removing the mutual authentication information stored in the second electronic device, when the reliability is not maintained.

11. A first electronic device comprising:
    a communication interface configured to communication-connect to a second electronic device and an authentication server;
    a memory configured to store mutual authentication information regarding the first electronic device; and
    a processor configured to:
       transmit a mutual authentication request for the first electronic device and the second electronic device to an authentication server;
       receive mutual authentication information for each of the first electronic device and the second electronic device from the authentication server;
       store the received mutual authentication information in the first electronic device and the second electronic device;
       determine whether reliability of an authentication state between the first electronic device and the second electronic device is maintained;
       acquire an authentication result for a service using the second electronic device from the authentication server by using the mutual authentication information for each of the first electronic device and the second electronic device, when the reliability is maintained; and
       provide the authentication result to the second electronic device,
    wherein the mutual authentication request comprises device Identification (ID) information of the first electronic device, device ID information of the second electronic device, account information, and a password, and
    wherein the mutual authentication information for each of the first electronic device and the second electronic device comprises an encrypted token, and
    wherein the authentication result comprises a Uniform Resource Locator (URL) providing an authentication code for the service.

12. The first electronic device of claim 11, wherein the processor determines whether the reliability is maintained based on at least one of whether an authorized user is biometrically identified by the second electronic device, whether the second electronic device has been separated from the user after mutual authentication, and whether communication between the first electronic device and the second electronic device has been disconnected after the mutual authentication.

13. The first electronic device of claim 11, wherein the processor removes the mutual authentication information stored in each of the first electronic device and the second electronic device, when the reliability is not maintained.

14. A second electronic device comprising:
    a communication interface configured to communication-connect with a first electronic device;
    a memory configured to store mutual authentication information regarding the second electronic device; and a processor configured to:
 transmit a mutual authentication request for the first electronic device and the second electronic device to the first electronic device;
 receive mutual authentication information regarding the second electronic device via mutual authentication information issued by an authentication server for each of the first electronic device and the second electronic device from the first electronic device;
 store the received mutual authentication information;
 determine whether reliability of an authentication state between the first electronic device and the second electronic device is maintained; and
 acquire an authentication result for a service using the second electronic device from the authentication server through the first electronic device by using the mutual authentication information regarding the second electronic device, when the reliability is maintained,
 wherein the mutual authentication request comprises device Identification (ID) information of the second electronic device,
 wherein the mutual authentication information comprises an encrypted token, and
 wherein the authentication result comprises an authentication code acquired by the first electronic device from a Uniform Resource Locator (URL) providing the authentication code for the service.

15. The second electronic device of claim 14, further comprising a biometric sensor configured to sense a biometric signal of a user, wherein the processor determines whether the reliability is maintained based on at least one of whether an authorized user is biometrically identified by the biometric sensor, whether the second electronic device has been separated from the user after mutual authentication, and whether communication between the first electronic device and the second electronic device has been disconnected after the mutual authentication.

16. The second electronic device of claim 14, wherein the processor removes the mutual authentication information stored in the second electronic device, when the reliability is not maintained.

* * * * *